May 19, 1953           W. BRZOZOWSKI           2,638,989
METHOD OF BURNING FUEL IN JET-OPERATED ROTOR BLADES
Original Filed Nov. 28, 1945           4 Sheets-Sheet 1

INVENTOR

May 19, 1953 W. BRZOZOWSKI 2,638,989
METHOD OF BURNING FUEL IN JET-OPERATED ROTOR BLADES
Original Filed Nov. 28, 1945 4 Sheets-Sheet 2

INVENTOR
Witold Brzozowski
BY Emery Varney
Whittemore & Dix
ATTORNEYS

May 19, 1953     W. BRZOZOWSKI     2,638,989
METHOD OF BURNING FUEL IN JET-OPERATED ROTOR BLADES
Original Filed Nov. 28, 1945     4 Sheets-Sheet 3

INVENTOR
Witold Brzozowski
BY Emery, Varney,
Whittemore & Dix
ATTORNEYS

May 19, 1953  W. BRZOZOWSKI  2,638,989
METHOD OF BURNING FUEL IN JET-OPERATED ROTOR BLADES
Original Filed Nov. 28, 1945  4 Sheets-Sheet 4
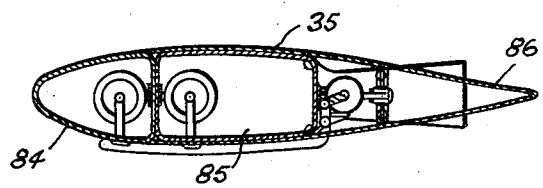
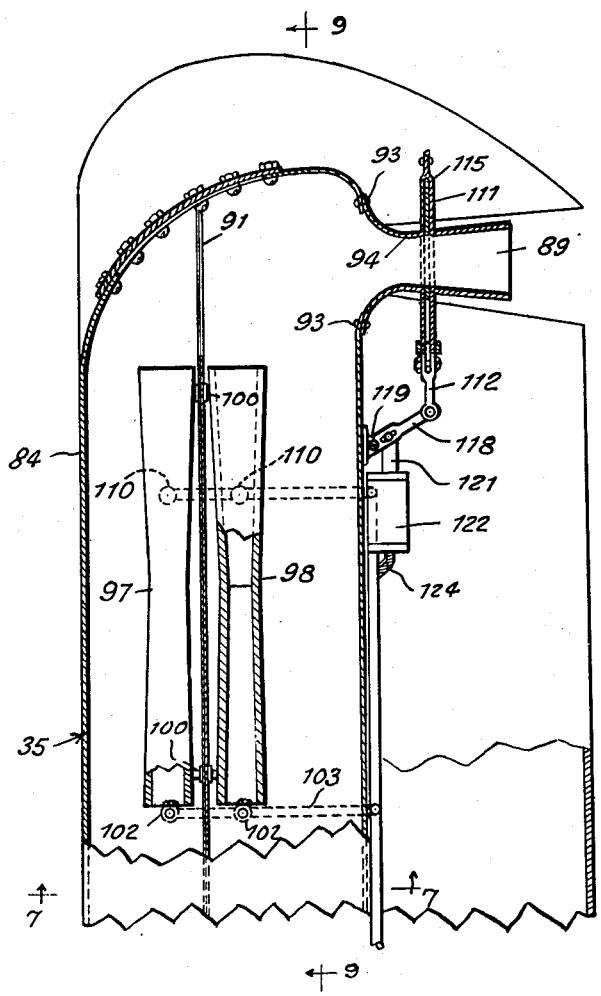
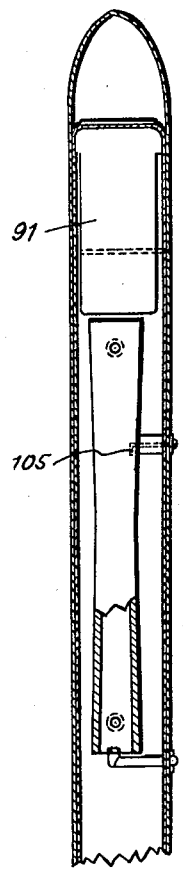
INVENTOR
BY
ATTORNEYS Patented May 19, 1953

2,638,989

UNITED STATES PATENT OFFICE 2,638,989

METHOD OF BURNING FUEL IN JET-OPERATED ROTOR BLADES

Witold Brzozowski, Westmount, Montreal, Quebec, Canada, assignor to Stefan Czarnecki, Walden, N. Y.

Original application November 28, 1945, Serial No. 631,319. Divided and this application August 23, 1949, Serial No. 116,190

2 Claims. (Cl. 170—135.4)

This application is a division of application S. N. 631,319, filed November 28, 1945, which matured as Patent No. 2,601,258.

This invention relates to aircraft.

It is an object of this invention to provide an improved aircraft that has its power system combined with auxiliary means for providing the additional power required for take off, and in the case of a helicopter, for vertical flight. In the preferred embodiment of the invention a helicopter has a jet-propelled rotor, and the additional power for take off and vertical flight is obtained by burning fuel within the conduits through which compressed air flows to the jet openings or nozzles. This auxiliary heating is a less efficient use of the fuel than is obtained from an internal combustion engine driving a compressor, but it provides the added power with little additional weight and cost of equipment, and since it is used only for short periods, the operating efficiency is of less importance than the weight which would be required for the additional engine and compressor capacity that would be needed to get a boost in power equivalent to that obtained from the use of the auxiliary heaters of this invention.

One feature of the invention relates to a burner construction for heating a stream of gas while the gas is traveling at substantial velocity. The invention utilizes a tube placed in such a position that a portion of the air stream travels through the tube. A fuel sprayer at the upstream end of the tube supplies fuel that mixes with the air and burns as it flows along the length of the tube. The tube is highly heated to a temperature above the ignition temperature of the fuel, and the diameter of the tube is correlated with the airstream velocity and rate of flame propagation so that the stream of fuel and air is burned throughout its entire cross section before reaching the end of the tube.

Other objects, features and advantages will appear or be pointed out as the specification proceeds.

In the drawings, forming a part hereof, in which like reference characters indicate corresponding parts in all the views, Figure 1 is a side elevation of a helicopter, partly broken away, illustrating the manner in which compressed air is supplied to the rotor and heated by exhaust gas from the engine.

Figure 7 is a reduced scale sectional view through one of the rotor blades, the section being taken on the line 7—7 of Figure 8.

Figure 8 is a transverse sectional view through the rotor blade shown in Figure 7.

Figure 9 is a sectional view taken on the line 9—9 of Figure 8.

Figure 1:
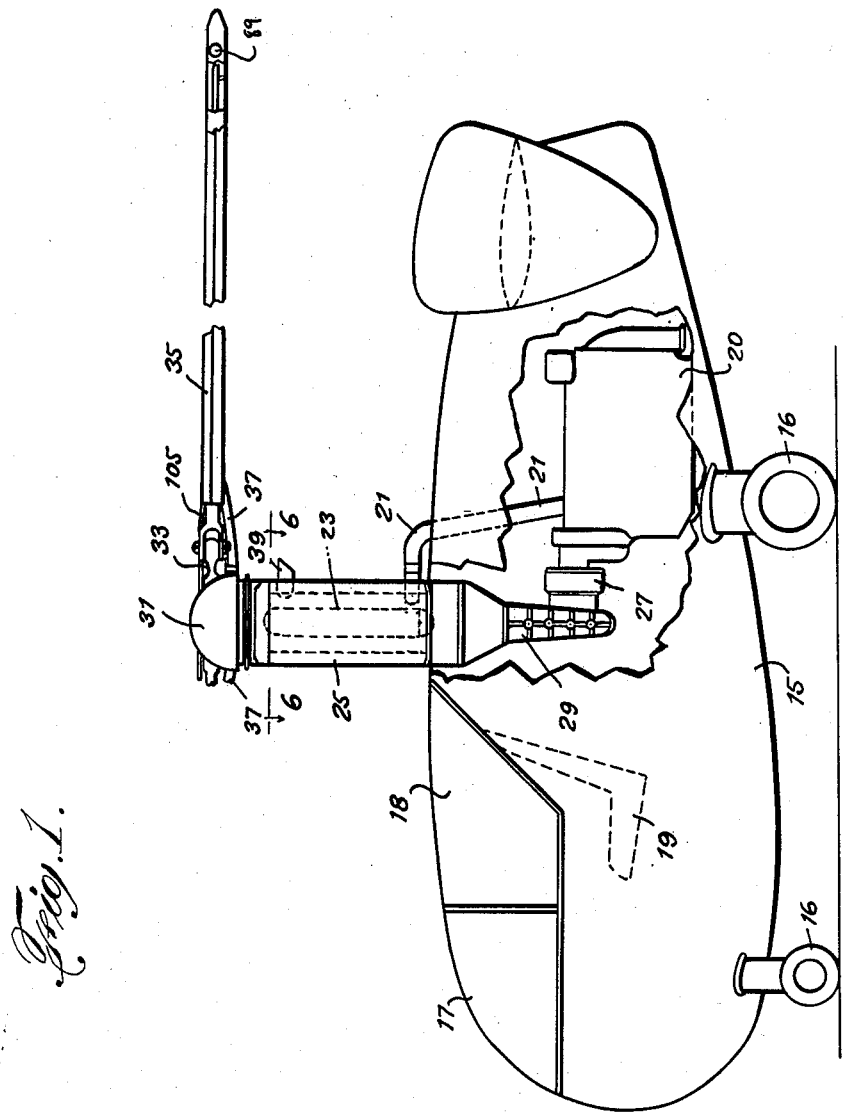

The helicopter shown in Figure 1 includes a fuselage 15 with wheels 16 and a forward passenger compartment closed by a wind shield 17 and cover 18. Seats 19 within the passenger compartment are indicated by dotted lines. In the rearward end of the fuselage there is an internal combustion engine 20 with an exhaust pipe 21 which extends upward to a heat exchanger 23 located in a pylon 25 secured to the upper portion of the fuselage.

The engine 20 drives a compressor 27 that delivers compressed air into a transition section 29 communicating with a lower end of the pylon 25. A rotor hub 31 is attached to the upper end of the pylon 25 and has articulation links 33 angularly spaced around the hub for connection with rotor blades 35.

Compressed air from the housing 29 passes up through the hollow pylon 25, around the exhaust heat exchanger 23, and into the lower portion of the hub 31 in which the compressed air divides and passes through conduits 37 leading to the respective blades of the rotor.

This heat exchanger 23 comprises a metal vessel closed at both ends by caps integrally secured to the walls of the vessel. The exhaust pipe 21 from the engine is connected with an inlet pipe at the lower end of the heat exchanger, and there is a tail pipe 39 at the upper end of the heat exchanger from which the exhaust gas escapes to the atmosphere. This construction permits the exhaust gas from the engine to pass through the heat exchanger 23 and out through the exhaust tail pipe 39 at the rear of the pylon without mixing with any of the compressed air which moves up through the pylon 25. The heat exchanger 23 radiates heat to the interior of the pylon and also transmits heat to the air stream in the pylon by conduction to the air which comes in contact with the outside surface of the heat exchanger 23. More complicated heat exchangers can be used in order to cut down the length of the heat exchanger, but since the pylon 25 has to be of substantial length in order to locate the rotor high enough above the fuselage, advantage can be taken of the full length of the pylon and a simple and lightweight heater used. The apparatus shown is merely representative of heat exchangers.

Figure 2:
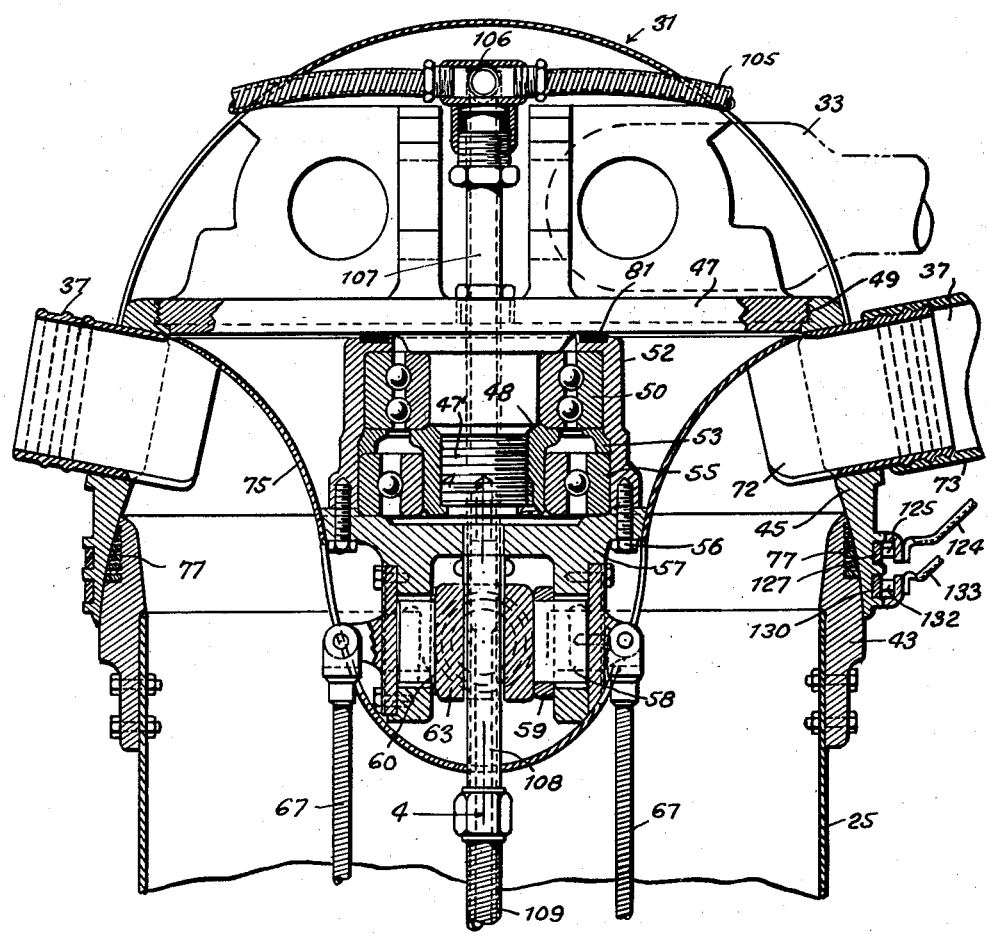
Figure 2 is an enlarged, sectional view of the rotor hub and the connections for supplying fuel and compressed air from the hub to the rotor blades.

The internal construction of the hub 31 is shown in Figure 2. The hub includes a non-rotatable or fixed portion 43 bolted to the upper end of the pylon 25, and a rotatable portion 45. The rotatable portion 45 is held down on the non-rotating member 43 by an attaching element 47 which has a threaded center portion extending down and screwed into a nut 48. This attaching member 47 has threads 49 around its peripheral edge screwed into the rotatable hub member 45.

The nut 48 holds the inner race of a combined axial and thrust bearing 50 against a shoulder of the attaching member 47, and a bearing housing 52, which fits over the bearing 50, holds the outer race of the bearing 50 against a spacer 53 which in turn bears against the outer race of an alignment bearing 55. The inner race of this alignment bearing 55 fits over the nut 48.

Figure 4:
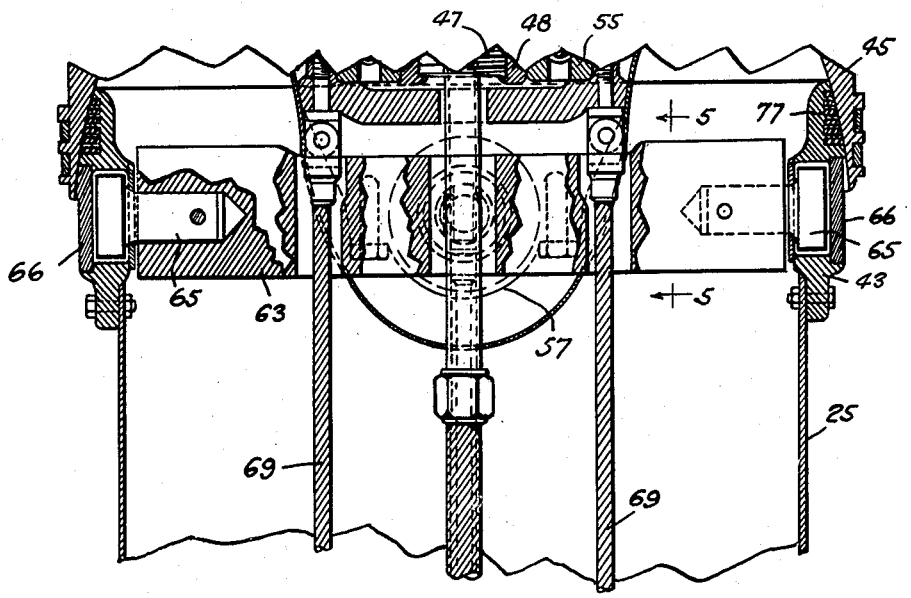
Figure 4 is a sectional view on the line 4—4 of Figure 2.
Figure 5:
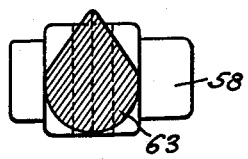
Figure 5 is a sectional view on the line 5—5 of Figure 4.
Figure 6:
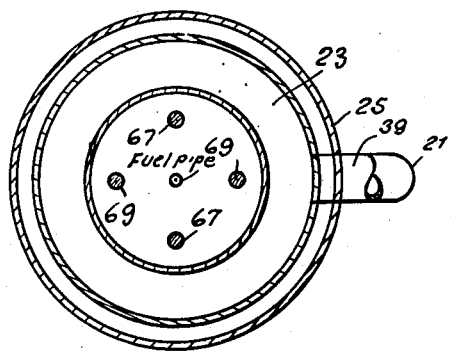
Figure 6 is an enlarged sectional view, on line 6—6 of Figure 1, through the pylon and heat exchanger.

The bearing housing 52 has its lower end connected to a longitudinal control yoke 57 by screws 56. The yoke 57 is mounted on a pin 58 with spacers 59 and 60. This pin extends from both sides of a lateral control axle 63, and the lateral control axle 63 is pivotally attached to the fixed portion 43 of the rotor hub by axle pins 65 (Figure 4) held in place by covers 66. The ends of the axle 63 are streamlined, as shown in Figure 5, so as to reduce the resistance that they offer to the upward passage of compressed air from the pylon. The helicopter is controlled laterally by means of lateral control cables 67 (Figure 2), and longitudinally by means of longitudinal control cables 69 (Figure 4). The mating surface of the rotatable hub portion 45 over the fixed hub portion 43 is substantially spherical about a center at which the axis of the pin 58 intersects the axis of the pins 65, and the rotatable hub portion 45 can be tilted in any direction by means of the control cables 67 and 69. The rotor can, therefore, be tilted forwardly so that the aircraft will be propelled forwardly without the use of an air screw, making the aircraft, properly speaking, a helicopter.

Rotation of the rotor is obtained by the reaction of jets of compressed air or gas expelled from the blades or from some jet orifice or nozzle connected to the blades. For purposes of the description and claims, the term "blade" in a broad sense to include not only the blade structure proper but any nozzles, pipes and other elements attached to the blade and rotatable as a unit with it.

Compressed air that passes up through the pylon 25 enters the conduits 37 which communicate with the interior of the rotor blades. These conduits 37 include a fitting 72 which extends from the rotatable portion 45 of the hub and a flexible tube 73 that leads to a fitting on the rotor blade. There is a generally conical shield 75 within the hub for giving the compressed air chamber of the hub a fair form that reduces turbulence in the stream of air passing off from the pylon 25 and out through the conduits 37 to the rotor blades of the helicopter. Leakage between the fixed portion 43 and rotatable portion 45 of the rotor hub is reduced to a minimum by means of labyrinth glands 77.

Figure 3:
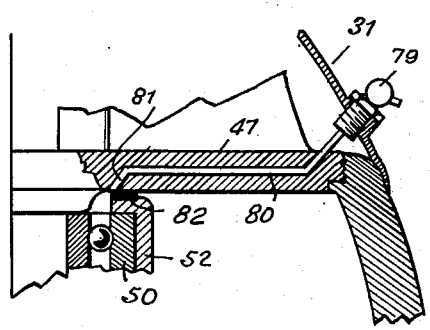
Figure 3 is a detail view showing the way in which lubricant is supplied to the center bearings of Figure 2.

Figure 3 shows the way in which lubricant is supplied to the bearing 50 and other bearings incased beneath the connecting element 47. A lubricant fitting 79 extending from the outside of the hub 31 leads to a passage 80 in the attaching element 47. This passage 80 has an outlet 81 opening into the housing 52 above the bearing 50 so that lubricant forced into the fitting 79 passes through the passage 80 and from the outlet 81 drops down on the bearings within the housing 52. Lubricant is sealed in the housing 52 by a sealing ring, such as a felt washer 81, retained in an annular groove in the top of the housing 53 and bearing against the underside of the attaching element 47.

Figure 7 shows a section through one of the rotor blades 35. These blades are made of sections that include a leading edge section 84, a center section 85 and a trailing edge section 86. Compressed air flows lengthwise in the blade 35 through the sections 84 and 85, both of which serve as conduits for the compressed air. Near the outer edge of the blade 35 there is a jet opening or nozzle 89 through which compressed air from within the rotor blade flows rearwardly to develop the reaction which drives the blade forward. The nozzle 89 opens directly into the center section 85, but compressed air or gas from the leading edge section 84 flows into the center section at the region of the nozzle 89 through an opening 91.

In the construction shown in Figure 8, the nozzle 89 is a separate element connected to the center section of the rotor blade by fastenings such as rivets 93, and this nozzle 89 has a restricted throat section 94 and an expanding outlet for discharging the gas or air at high velocity. The jet orifice or nozzle can be made as an integral part of the center section of the rotor blade, and the blade can be made without the different sections shown, and shaped to provide a suitable outlet for the gas. The term "nozzle" is used in a broad sense, therefore, to indicate any jet opening from which the compressed gas can be discharged under conditions of substantial velocity and without excessive turbulence which would destroy the efficiency of the jet reaction.

In order to obtain extra thrust for conditions such as exist during take off, and for developing the extra power needed for hovering and for vertical flight, auxiliary heaters are provided in the blade conduits through which the compressed air passes to the nozzle 89. Figures 7 and 8 show burners comprising elongated tubes 97 and 98 in the sections 84 and 85 respectively. Each of these tubes is connected with a wall of the conduit by supporting means 100 which hold the tubes 97 and 98 with their axes extending in the general direction of the flow of the gas stream and in such position that a portion of the gas stream in each of the sections 84 and 85 passes through the tube 97 or 98 enclosed in that section. These tubes 97 and 98 are in effect by-pass conduits through which a portion of the air travels to the end of the blade. The supporting means 100 contact only a small part of the tubes 97 and 98 and hold these tubes out of contact with the remainder of the blade structure so that the tubes are substantially insulated from the blade structure and can operate at high temperatures.

Toward the upstream end of each of the tubes 97 and 98 there is a fuel sprayer 102, both of which are supplied with fuel from a supply pipe 103 that passes down the inside of the blade and communicates with a flexible fuel supply tube 105 (Figure 2) leading to a fuel header 106 in the rotor hub. This header 106 is at the upper end of a vertical feed pipe 107 that rotates as a unit with the rotor but extends down into a lower feed pipe 108 attached to the non-rotatable portions of the rotor hub. This connection provides a rotatable joint in the fuel line. A flexible tube 109 at the lower end of the pipe 108 permits the pipe 108 to move as a unit with the tiltable elements of the rotor. This fuel pipe 108 connects with a fuel supply source, not shown, from which fuel is supplied to the tube 109, pipe 108, and header 106 under some pressure.

The tubes 97 and 98 are made of material, either ceramic or metal, that can be heated above the ignition temperature of the fuel with which the burners are intended to be used. Each of the burners is provided with an electrical ignition device such as a spark plug 105 located down stream from the fuel sprayers 102. When the burners are used, fuel is supplied to the sprayers 102 and the atomized or vaporized fuel from the sprayers travels down the tubes with the current of air that enters the open end of the tubes around the sprayers 102. This mixture of fuel and air is ignited by the spark plugs 105 and burns within the tubes 97 and 98 causing the tubes to become heated to a temperature above the ignition temperature of the fuel. Because of the high velocity of the air stream through the rotor blade and through the tubes 97 and 98, the flames would be blown away from the sprayers 102 and satisfactory combustion of the fuel would not be obtained were it not for the high temperature of the tubes 97 and 98 after the burners are in full operation. The diameter of the opening through each of the burners 97 and 98 is so correlated with the velocity of the air stream and the rate of flame propagation through the air-fuel mixture that flame ignited from the hot walls of the tube, if not otherwise, will traverse the entire cross section of the air-fuel stream and thoroughly burn the fuel before it passes from the tubes 97 and 98 and mixes with the other air on its way to the nozzle 89.

Higher efficiency can be obtained by projecting the reaction jets from the nozzle 89 only during the time that the rotor blade of that nozzle is advancing. In order to take advantage of this fact, the nozzle 89 is then equipped with a slide valve 111 having a yoke 112 by which the slide valve can be drawn across the nozzle 89 to shut off the flow of compressed gas from the nozzle when the rotor blade is retreating. The slide valve 111 moves in a guide 115 secured to the nozzle 89.

The operating mechanism for the slide valve 111 includes a lever 118 connected to the rotor by a pivot 119, and moved periodically by a plunger 121 that slides in a solenoid 122. Power to energize the solenoid 122 is supplied by a conductor 124. This conductor extends down the blade 35 to a brush 125 (Figure 2) that rides on a commutator 127, and the conducting and insulating sections of the commutator 127 are so correlated in their angular extent that power is supplied to operate the solenoid and close the valve to shut off the jet whenever the blade changes from an advancing to a retreating phase of its movement. The conducting segments of the commutator are insulated from the hub 31. A conductor ring 130, mounted on and insulated from the hub 31, is located just below the commutator 127 and supplies power through a brush 132 and conductor 133 to the spark plugs or other igniters for the burners in the rotor blades. There are separate brushes 125 and 132, and separate conductors 124 and 133 for each of the rotor blades.

The preferred embodiment of the invention has been described but changes and modifications can be made and some features of the invention can be used without others.

I claim as my invention:

1. The method of burning fuel in a sustaining airfoil section through which a stream of air is blown at a maximum velocity of V feet per second and in which the fuel mixture within the air has a rate of flame propagation of P feet per second in the air fuel mixture within the airfoil section, the flame propagation rate being substantially less than the velocity of the air stream, which method comprises passing a portion of the air stream through an open ended tube extending lengthwise of the air stream, mixing fuel with the portion of the air stream that flows through the tube by supplying the fuel to said portion of the air stream at a location near the upstream end of the tube, and igniting the air fuel mixture from incandescent surfaces of the tube wall throughout a length of the air-fuel stream which is equal in feet to at least $RV/P$ where R is the distance of the ignition wall surfaces from the longitudinal axis of the air-fuel stream.

2. In the heating of an air stream which passes through a helicopter rotor blade to a jet discharge orifice near the tip end of the blade, and in which a portion of the air stream passes through a combustion chamber open at both ends and extending longitudinally of the rotor blade, and in which another portion of the air stream passes between the combustion chamber and the rotor blade to prevent excessive heating of the rotor blade, the improvement that comprises injecting the fuel into the air stream in the tube and igniting the air fuel mixture from incandescent walls of the tube which extend for a distance equal to at least L feet down stream from the location at which the fuel is mixed with the air stream, and passing the air fuel mixture through the tube at a velocity in feet per second not greater than the ratio $PL/R$, where P is the rate of flame propagation in the air fuel mixture and R is the inside radius of the tube.

WITOLD BRZOZOWSKI.

References Cited in the file of this patent

UNITED STATES PATENTS

| Number | Name | Date |
| --- | --- | --- |
| 1,839,880 | Hyatt | Jan. 5, 1932 |
| 2,268,464 | Seippel | Dec. 30, 1941 |
| 2,371,687 | Gerhardt | Mar. 20, 1945 |
| 2,396,068 | Youngash | Mar. 15, 1946 |
| 2,418,911 | Smith | Apr. 15, 1947 |
| 2,448,561 | Way | Sept. 7, 1948 |
| 2,457,936 | Stalker | Jan. 4, 1949 |
| 2,470,184 | Pfenninger | May 17, 1949 |
| 2,477,683 | Birmann | Aug. 2, 1949 |
| 2,563,744 | Price | Aug. 7, 1951 |

FOREIGN PATENTS

| Number | Country | Date |
| --- | --- | --- |
| 227,151 | Great Britain | Jan. 12, 1925 |